United States Patent [19]

Farrand et al.

[11] Patent Number: 4,691,587
[45] Date of Patent: Sep. 8, 1987

[54] STEERING COLUMN WITH SELECTIVELY ADJUSTABLE AND PRESET PREFERRED POSITIONS

[75] Inventors: Robert M. Farrand, Saginaw; Thomas J. Milton, Essexville; William R. McDow, Saginaw, all of Mich.

[73] Assignee: General Motors Corporation, Detroit, Mich.

[21] Appl. No.: 811,733

[22] Filed: Dec. 20, 1985

[51] Int. Cl.⁴ .............................................. B62D 1/18
[52] U.S. Cl. ...................................... 74/493; 280/775
[58] Field of Search ............................ 74/493, 492, 510; 280/775, 779, 777

[56] References Cited

U.S. PATENT DOCUMENTS

| | | | |
|---|---|---|---|
| 2,769,351 | 11/1956 | Serfling et al. | 74/493 |
| 3,216,521 | 11/1965 | Ulrich | 74/493 |
| 3,693,997 | 9/1972 | Dreyer | 74/493 |
| 4,240,305 | 12/1980 | Denaldi et al. | 74/493 |
| 4,407,166 | 10/1983 | Protze et al. | 74/493 |
| 4,503,504 | 3/1985 | Suzumura et al. | 74/493 |
| 4,509,775 | 4/1985 | Arndt | 74/492 |

FOREIGN PATENT DOCUMENTS 2257483  8/1975  Fed. Rep. of Germany ........ 74/493

Primary Examiner—Cornelius J. Husar
Assistant Examiner—Peter M. Cuomo
Attorney, Agent, or Firm—Charles R. White

[57] ABSTRACT

A steering column assembly for a vehicle which provides an infinite number of column positions within a field of motion and a larger field of motion than existing mechanism with memory set for all possible column positions with automatic return to retracted position.

3 Claims, 8 Drawing Figures

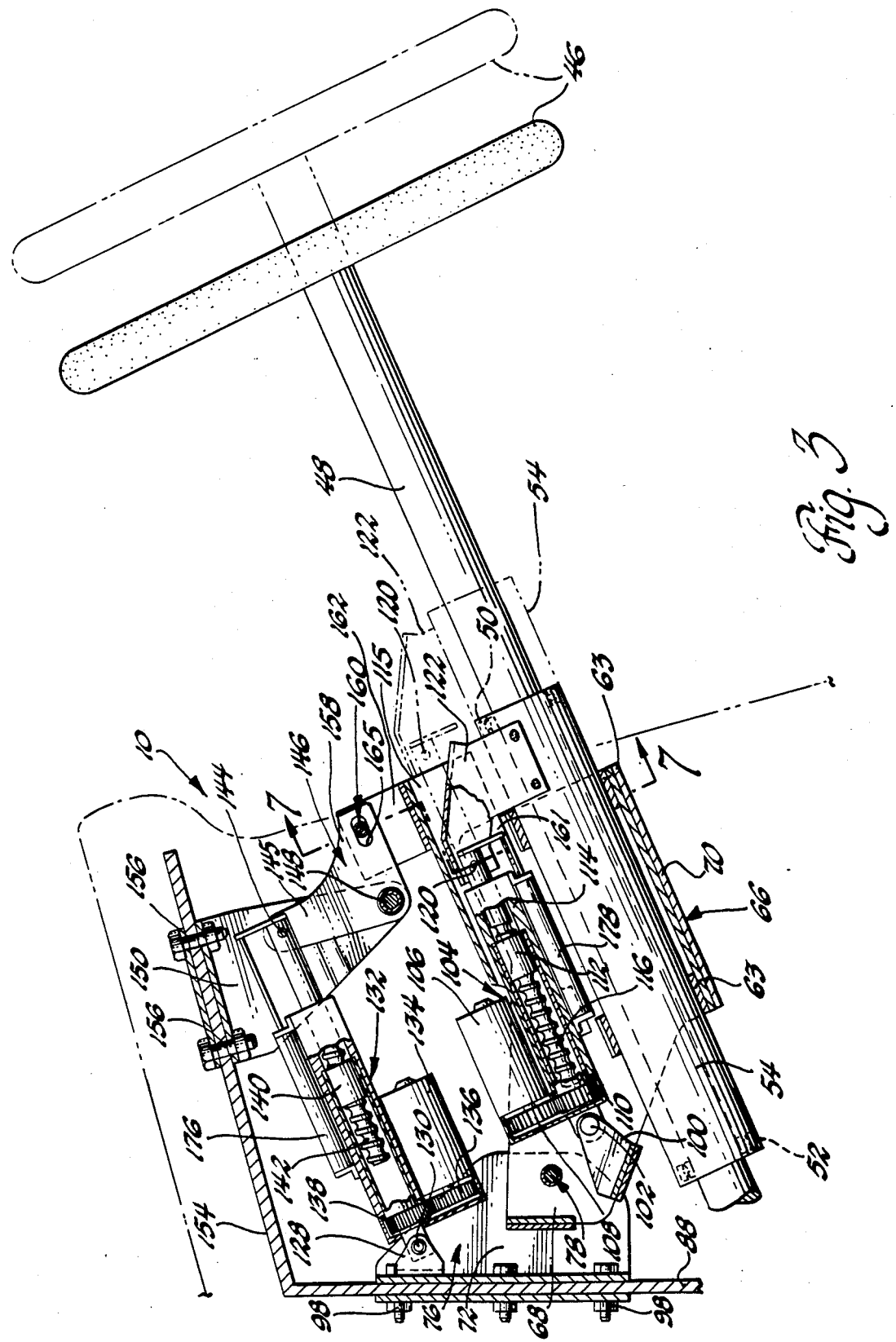

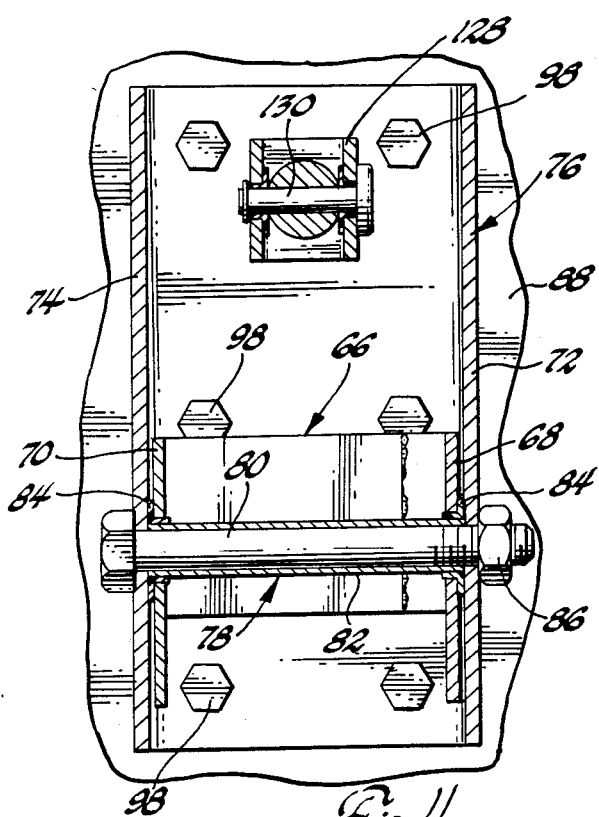
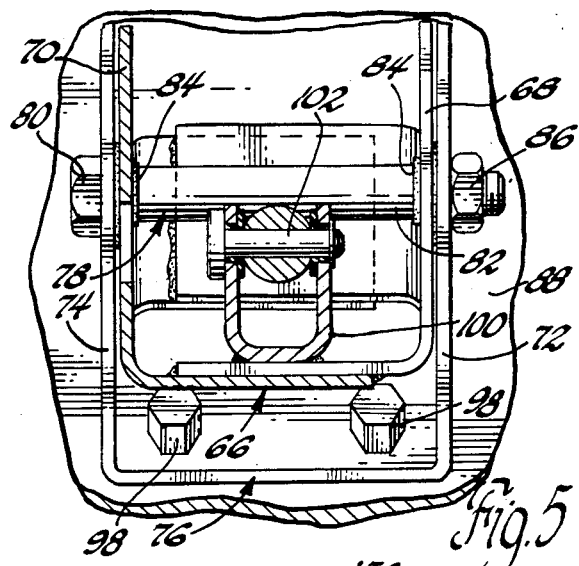
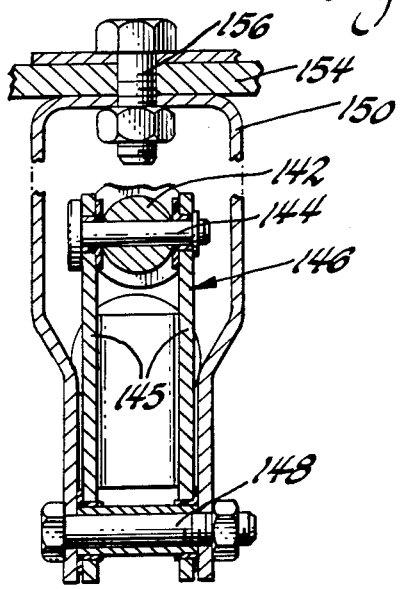
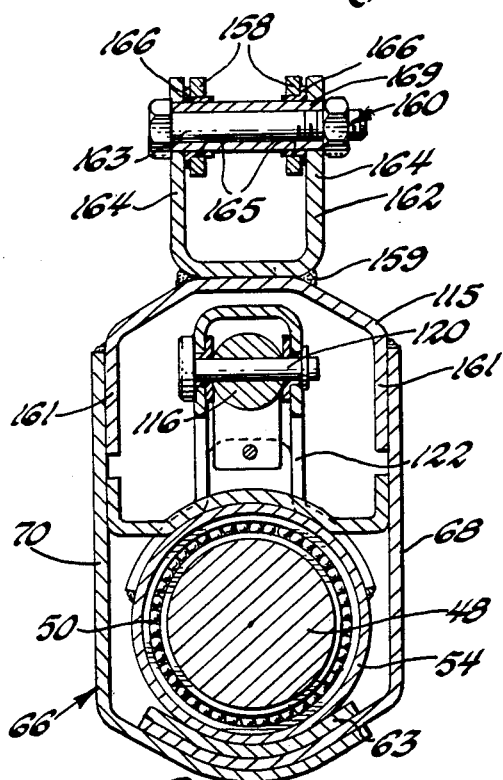
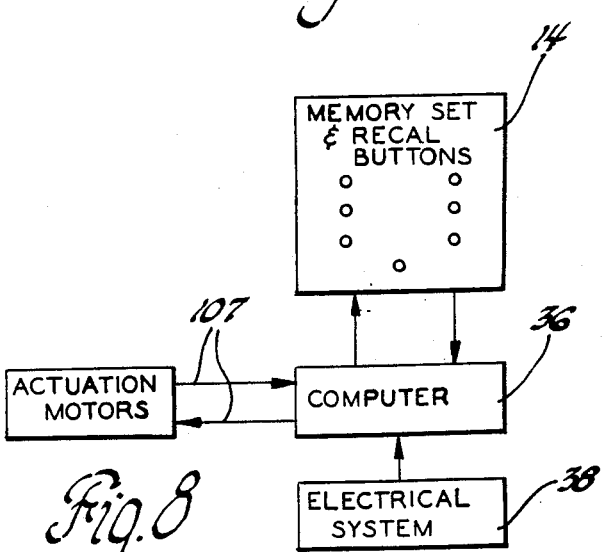

STEERING COLUMN WITH SELECTIVELY ADJUSTABLE AND PRESET PREFERRED POSITIONS

This invention relates to vehicle steering columns and more particularly to an adjustable steering column that is movable to an infinite number of selectively adjusted positions as a unit or a predetermined number of preset preferred tilt and telescoped positions.

Prior to the present invention, various steering column assemblies have had tilt and telescoping features built within the column to permit the operator to adjust the position of the hand wheel Cto suit particular requirements for improving operator entrance and egress and to improve operator comfort when driving the vehicle. While these prior columns have provided important benefits in improving driver comfort and vehicle operation, they generally involve relatively complex mechanical arrangements which control only a tilt head assembly of the column. Some of these units offer a telescoping feature. Generally these prior columns are not motorized and do not provide a range of set positions as preselected by several operators of the vehicle when they use the vehicle or an infinite number of tilt and telescoped adjusted positions as selected by an operator using the vehicle.

The column assembly of the present invention involves an articulated linkage and bracket assembly for column support and adjustment which is attached to a cross-support member or bulk head of the vehicle. The steering shaft mounting the hand wheel at its upper end is connected to the intermediate shaft by a slip joint with selected pivot points to allow the entire column to vary in tilt angle and to vary in telescoped position. This arrangement allows for a greater range of travel than prior columns and provides for an infinite number of available positions within that range. The present invention eliminates the need for tilt and telescoping components within the column since the entire column moves as a unit.

In the present invention, a set of electrically motor-driven actuators is employed to articulate the column through the linkage bracket assembly. Driver actuated push buttons or other manual controls may be used to control the actuators for up and down or tilt motion and forward and back or telescopic motions to position the hand wheel at selected positions. Additionally, a computer unit is tied into the electronic controls so that several drivers can set their preferred column positions. When the driver starts the vehicle, the preset preferred column position can be obtained by depressing individual buttons for each driver. The column automatically returns to a fully retracted position when the engine is shut down.

In this invention, the column is a straight-forward and versatile unit. Energy absorption in the linkage bracket is possible. All of the secondary functions of the column will be simplified since the column is a simple steering shaft assembly with a stamped jacket. This column can be used in all cars by using different mounting brackets. An instrument pod can be attached to the column so that the column keeps the controls such as lights, washer, radio, turn signals always in the same position with respect to the steering wheel.

These and other features, objects and advantages of this invention will be more apparent from the following detailed description and drawing in which:

FIG. 3 is an enlarged view of a portion of FIG. 2 which illustrates the various telescoped positions of the column assembly.

FIG. 4 is a sectional view taken along lines 4—4 of FIG. 2.

FIG. 5 is a sectional view taken along lines 5—5 of FIG. 2.

FIG. 6 is a sectional view taken along lines 6—6 of FIG. 2.

FIG. 7 is a sectional view taken along lines 7—7 of FIG. 3.

FIG. 8 is a diagram illustrating controls used with this invention.

Figure 1:
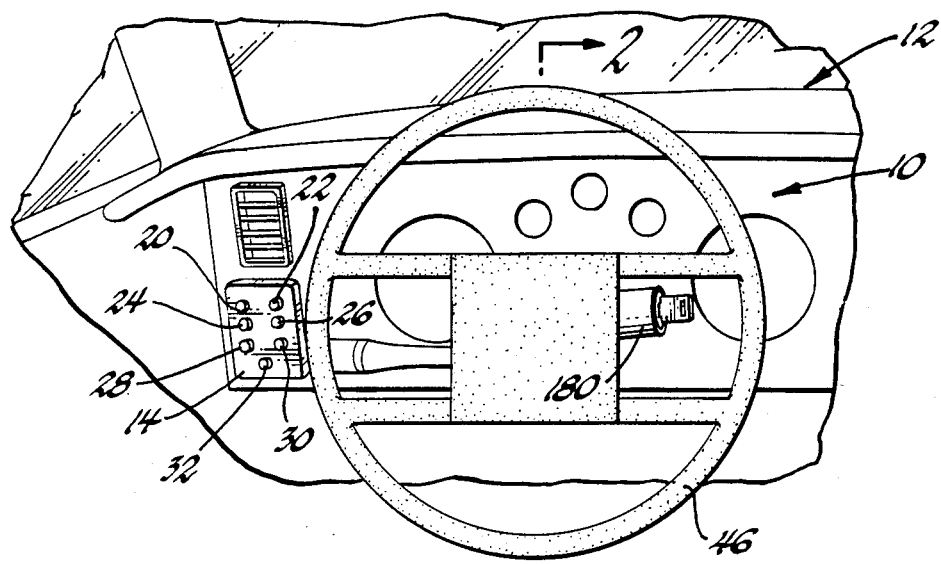
FIG. 1 is an elevational view of a steering wheel assembly mounted within a vehicle.

Turning now in greater detail to the drawings, there is shown in FIG. 1 a tilt and telescoping steering column assembly 10 operatively mounted within the interior of a vehicle 12 for steering the dirigible wheels thereof, not shown. A memory set and recall control button module 14 is mounted to the instrument panel or optionally attached to the column assembly for movement therewith for controlling the tilt and telescoped position of the steering column assembly 10 to facilitate driver entry and egress and comfort while operating the vehicle. This control button module has a series of push-type control buttons for selectively actuating electric motors and actuators for the tilt and telescopic adjustment of the entire column. Push button 20 is a control button for telescopically moving the column inwardly, push button 22 is for telescopically moving the column outwardly, push button 24 is for tilting the column upwardly, push button 26 is for tilting the column downwardly, and push button 28 is a first memory recall button for moving the column assembly to a first tilt and telescoped position as preset by a first driver. Push button 30 is similar to push button 28 and is a second recall button for a second driver for moving the column assembly to a different tilt and telescoped position. Push button 32 is a memory set button which a driver may depress in conjunction with selected other push buttons 28 and 30 to set preferred tilt and telescope positions.

As diagramatically shown in FIG. 8, the control button module 14 is operatively connected to a computer module 36 energized by the electrical system 38 of the vehicle. The computer 36 is connected to control and activate a pair of electric motor driven actuator assemblies used to tilt and telescope the steering column assembly.

Figure 2:
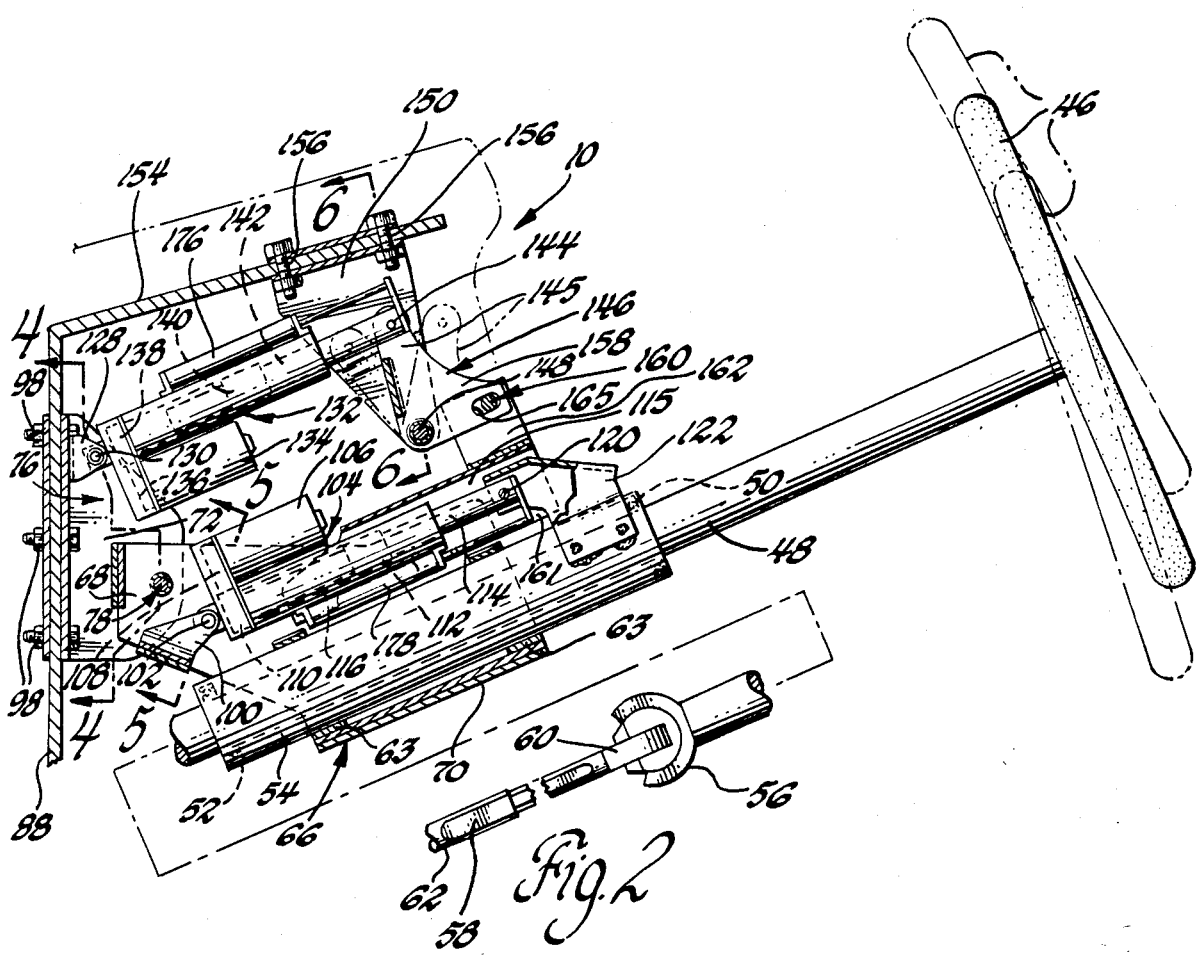
FIG. 2 is a view partially in section taken along lines 2—2 of FIG. 1 with various tilt positions illustrated.

FIG. 2 illustrates a preferred embodiment of the invention with the adjustable steering column assembly 10 including a hand wheel 46 drivingly connected to the upper end of an elongated steering shaft assembly 48 that is rotatably mounted by bearings 50, 52 in a stamped tubular jacket 54 that forms part of the assembly. The steering shaft assembly terminates in a universal pivot joint 56 which is, in turn, connected to an intermediate shaft assembly 58. The intermediate shaft assembly has an upper intermediate shaft 60 that is slip-fitted into a lower intermediate shaft 62. The lower intermediate shaft 62 is drivingly connected to conventional steerable road wheels by a rack pinion or other steering gear unit, not shown, for vehicle steering purposes. With this assembly, the hand wheel 46 can be turned by the driver to rotate the upper and intermediate steering shafts for vehicle steering in a conventional manner.

The jacket 54 is slidably supported on support pads 63 in a cradle-like tilt bracket 66 that has slide flanges 68, 70 which extend rearwardly and which are pivotally connected to the side flanges 72, 74 of a mounting bracket 76 by a pivot pin assembly 78 that includes an elongated hex-headed bolt 80, that extends through aligned openings in the side flanges of the tilt and mounting brackets, bushing 82 and anti-friction washers 84 and a retainer nut 86 threaded onto the extending end of the bolt 80. The mounting bracket 76 has a flat forward face that seats against the bulkhead 88 and is secured thereto by threaded fasteners 98.

Welded or otherwise secured to the tilt bracket 66 is an actuator support bracket 100 U-shaped in cross-section as shown in FIG. 5. The side flanges of this bracket carry at the upper end thereof an elongated pivot pin 102 which supports a first motor and actuator assembly 104. The motor 106 of this assembly is an electrically energizable motor connected by electric circuitry 107 to the computer 36 and is controlled by the computer under conditions described below. The output of the motor 106 drives meshing gears 108, 110 of a gear set which in turn rotatably drives a ball nut 112 operatively mounted in an actuator housing 114 that extends within an elongated bracket 115. A ball nut screw 116 extends through the ball nut 112 and is operatively connected thereto by a conventional ball train. At its outboard end, the screw 116 is connected by pivot 120 to a bracket 122 which is welded or otherwise connected at its downwardly extending end to the tubular jacket 54.

In addition to supporting the tilt bracket 66, the mounting bracket 76 has, as shown in FIGS. 2, 3 and 4, a support bracket 128 U-shaped in cross-section welded thereto which has a pivot pin 130 supported by side flanges at the outer end thereof. Pivotally mounted to the outer end of this bracket by pin 130 is an actuator assembly 132 which is similar to the actuator assembly 104. This actuator assembly includes an electric motor 134, energized through the computer 36 that has an output which drives meshing gears 136 and 138. The gear 138 rotatably drives a ball nut 140 which in turn, linearly drives a ball nut screw 142 extending therethrough. The outer end of the ball nut screw is connected by a pivot pin 144 to the outer ends of the upper arms 145 of a twin-plate bell crank 146. The bell crank 146 is supported by a pivot pin assembly 148 to the side plates of a bracket 150. Bracket 150 extends downwardly from attachment with the inclined forward plate 154 of bulkhead 88 by bolts 156. The forward arm 158 of the bell crank 146 is connected by a sliding pivot assembly 160 to the side flanges of a U-shaped bracket 162. Bracket 162 is welded at 159 to the bracket 115 which houses the actuator 104 and has depending side flanges 161 welded or otherwise fixed to the tilt bracket 66 so that the bell crank 146 can tilt the steering column assembly when it is turned as shown in FIG. 2. The sliding pivot assembly 160 includes a bolt 163 that extends through elongated slots 165 in the forward arms 158 of the bell crank and is secured to the side flanges 164 of the bracket 162. Anti-friction washers 166 mounted on a bushing 169 carried by bolt 163 and adjacent each end thereof ride in longitudinally extending slots 165 in the forward arms 158 of the bell crank as shown best by FIGS. 2 and 3.

Linear potentiometers 176 and 178 as shown in FIG. 3 are operatively connected to the actuator assemblies. These potentiometers are adjusted by the operation of the actuator assemblies to provide a steering column position input to the computer.

In operation when the ignition switch assembly 180 is off, the computer will effect movement of the steering column assembly 10 to a predetermined position such as a fully tilted up and a fully telescoped in position to facilitate operator egress and ingress. Assuming the operator has entered the vehicle, the position of the column assembly may be adjusted by pushing selected buttons for column adjustment. The column may be telescoped out through push button 22 and tilted down by depressing button 26. After the column assembly has reached its desired tilt and telescoped position the buttons will be released so that position is maintained. The operator can then proceed to drive the vehicle with the selected position. In the event that the driver wishes to put this position into the computer memory, the driver will depress memory button 32 and first driver recall button 28. This sets the memory so that this position can be automatically obtained upon the subsequent entry into the vehicle by merely pushing the recall button 28. In a similar manner, a second driver desiring a different position can select and set the tilt and telescope position of the column by setting the recall button 30 with the memory set button 32. Assuming that any driver wishes to change the setting, the telescoping in and out buttons 20, 22 can be selectively depressed along with tilt up and down buttons 24, 26 When the ignition key is turned to the off position, the column assembly will return to its predetermined telescoped inwardly and tilt upwardly position.

While a preferred embodiment of this invention has been shown and described, other embodiments will now be apparent to those skilled in the art.

The embodiments of the invention in which an exclusive property or privilege is claimed are defined as follows:

1. An articulated tilt and telescoping steering column assembly for a vehicle comprising a steering shaft assembly having an elongated steering shaft extending within the vehicle and terminating in a pivot joint at the lower end thereof, hand wheel means affixed to the upper end of said steering shaft for turning the steering shaft for steering the steerable road wheels of the vehicle, said steering column assembly including a jacket mounting said steering shaft for rotation therein and for transmitting a linear telescoping force to said shaft, an intermediate shaft assembly having first and second shaft parts and having an upper end connected to said pivot joint and a lower end adapted to be operatively connected to the steerable road wheels of the vehicle, slip joint means operatively connecting said intermediate shaft parts and allowing said intermediate shaft parts to linearly slip relative to each other and to transmit torque therebetween, tilt bracket means for supporting said jacket and said steering shaft for axial sliding movement therein, a support, pivot means for mounting said tilt bracket means to said support for tilting movement of said bracket and steering column assembly, and first and second motorized actuator means operatively connected to said support and to said jacket for moving said steering shaft assembly to an infinite number of tilt and axially adjusted positions.

2. The steering column assembly defined in claim 1 wherein said first and second actuator means comprise first and second electric motor means respectively connected to said tilt bracket means and to said jacket, and control means for electrically energizing said electric motor means for moving said steering column assembly as a unit to predetermined first and second tilt and telescoped positions.

3. The steering column asembly defined in claim 2 and including additional control means for controlling said electric motor means for moving said column assembly as a unit to an infinite number of tilt and telescoped positions thereby moving the hand wheel to any of an infinite number of selected positions to facilitate vehicle steering operation.

* * * * *